United States Patent [19]

Billmers et al.

[11] Patent Number: 4,788,280
[45] Date of Patent: Nov. 29, 1988

[54] POLYSACCHARIDE DERIVATIVES CONTAINING ALDEHYDE GROUPS ON AN AROMATIC RING, THEIR PREPARATION FROM THE CORRESPONDING ACETALS AND USE IN PAPER

[75] Inventors: Robert L. Billmers, Stockton; Martin M. Tessler, Edison; David M. Del Giudice, Somerset; Craig Leake, Edison, all of N.J.

[73] Assignee: National Starch and Chemical Corporation, Bridgewater, N.J.

[21] Appl. No.: 93,939

[22] Filed: Sep. 8, 1987

Related U.S. Application Data

[63] Continuation-in-part of Ser. No. 27,975, Mar. 19, 1987, abandoned, which is a continuation-in-part of Ser. No. 829,675, Feb. 14, 1986, Pat. No. 4,703,116, which is a continuation-in-part of Ser. No. 758,634, Jul. 24, 1985, Pat. No. 4,675,394, which is a continuation-in-part of Ser. No. 641,820, Aug. 17, 1984, abandoned.

[51] Int. Cl.$^4$ .................... C08B 31/02; C08B 31/08; C08B 11/04; C08B 37/14
[52] U.S. Cl. .................... 536/104; 162/158; 536/4.1; 536/43; 536/44; 536/45; 536/50; 536/52; 536/84; 536/111; 536/114
[58] Field of Search .................... 536/104, 43, 4.1, 44, 536/45, 50, 52, 84, 111, 114; 162/158

[56] References Cited

U.S. PATENT DOCUMENTS

| | | | |
|---|---|---|---|
| 3,706,633 | 12/1972 | Katchalski et al. | 195/63 |
| 4,158,594 | 6/1979 | Becker et al. | 162/158 |
| 4,610,761 | 9/1986 | Eklund et al. | 162/158 |
| 4,675,394 | 6/1987 | Solarek et al. | 162/158 |
| 4,703,116 | 10/1987 | Solarek et al. | 536/104 |

FOREIGN PATENT DOCUMENTS 57-202362 12/1982 Japan .
934571 8/1963 United Kingdom .

*Primary Examiner*—Ronald W. Griffin
*Attorney, Agent, or Firm*—Margaret B. Kelley; Edwin M. Szala

[57] ABSTRACT

Polysaccharide aldehydes having the formula

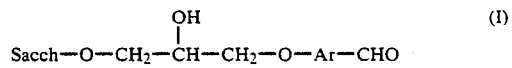

or Sacch—O—CH$_2$—Ar—CHO (II) such as starch, cellulose, and gum aldehydes, are useful as paper additives for imparting strength and as the granular or gelatinized portion of a corrugating adhesive. Those having formula I are prepared by a nonoxidative method which involves reacting the polysaccharide base, in the presence of alkali, with a derivatizing acetal reagent having the general structure

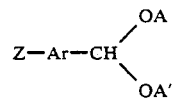

and then hydrolyzing the acetal by adjusting the pH to less than 7, preferably 2–4. In the formula Ar is an aryl group, optionally containing an ether linkage, or an alkaryl group and A and A' are lower alkyls or together form at least a 5-membered cyclic acetal. The polysaccharide aldehydes are crosslinked by the addition of selected polyfunctional crosslinkers such as an aliphatic primary polyamine or polyketone.

29 Claims, No Drawings

POLYSACCHARIDE DERIVATIVES CONTAINING ALDEHYDE GROUPS ON AN AROMATIC RING, THEIR PREPARATION FROM THE CORRESPONDING ACETALS AND USE IN PAPER

This application is a continuation-in-part of Ser. No. 27,975, filed Mar. 19, 1987, now abandoned which is a continuation-in-part of Ser. No. 829,675, filed Feb. 14, 1986, U.S. Pat. No. 4,703,116 which is a continuation-in-part of Ser. No. 758,634 filed July 24, 1985, U.S. Pat. No. 4,675,394 which is a continuation-in-part of Ser. No. 641,820 filed Aug. 17, 1984, now abandoned.

BACKGROUND OF THE INVENTION

The present invention relates to polysaccharide derivatives containing aldehyde groups on an aromatic ring and to the acetal derivatives used in the preparation of some of the aldehyde-containing polysaccharide derivatives. It also relates to a non-oxidative process for introducing aldehyde groups into polysaccharides, particularly granular polysaccharides. It further relates to the use of the cationic polysaccharide derivatives as paper additives and the use of the starch derivatives in corrugating adhesives.

As used herein, the term "paper" includes sheet-like masses and molded products made from fibrous cellulosic materials which may be derived from natural sources as well as from synthetics such as polyamides, polyesters, and polyacrylic resins, and from material fibers such as asbestos and glass. In addition, papers, made from combinations of cellulosic and synthetic materials are applicable herein. Paper-board is also included within the broad term "paper", with "corrugated paperboard" referring to a fluted medium and a facing adhesively joined to the tips on one or both sides of the fluted medium.

Oxidative and non-oxidative methods have been used to introduce aldehyde groups into polysaccharides such as starches, gums, and celluloses. The oxidative methods used have included treatment with periodic acid, periodates, or alkali metal ferrates. See U.S. Pat. No. 3,086,969 (issued Apr. 23, 1963 to J. E. Slager) which discloses an improved process for the preparation of a dialdehyde polysaccharide, (e.g., starch) using periodic acid; U.S. Pat. No. 3,062,652 (issued Nov. 6, 1962 to R. A. Jeffreys et al.) which discloses the preparation of dialdehyde gums (e.g., gum acacia, pectin, and guar) using periodate or periodic acid; and U.S. Pat. No. 3,632,802 (issued Jan. 4, 1972 to J. N. BeMiller et al.) which discloses a method for oxidizing a carbohydrate, (e.g., starch or cellulose) with an alkali metal ferrate.

In the above methods the aldehyde groups are formed by the oxidation of the hydroxyl groups on the ring and/or side chain. Treatment with periodic acid or periodate selectively oxidizes the adjacent secondary hydroxyl groups on the ring carbon atoms (e.g., the 2,3-glycol structures), cleaves the ring, and results in a "so-called" dialdehyde derivative which is principally a hydrated hemialdal and intra- and intermolecular hemiacetals. Treatment of carbohydrates with alkali metal ferrates selectively oxidizes the primary alcohol group on the side chains without ring cleavage or oxidation of the ring hydroxyls.

The disadvantages of the oxidative method include degradation to lower molecular weight products and the formation of carboxyl groups due to further oxidation of the aldehyde groups. U.S. Pat. No. 3,553,193 (issued Jan. 5, 1973 to D. H. LeRoy et al.) describes a method for oxidizing starch using an alkali metal bromite or hypobromite under carefully controlled conditions. The resulting dialdehyde is reported to have a substantially greater proportion of carbonyl groups (i.e., aldehyde groups) than carboxyl groups. It also discloses a method for selectively oxidizing the side chains of starch derivatives (e.g., an alkoxylated starch such as dihydroxypropyl starch) under the same process conditions whereby the underivatized starch hydroxy groups on the rings are substantially non-oxidized.

The presence of carboxylic groups in aldehyde starches has several disadvantages in addition to the obvious reduction in the degree of aldehyde substitution. These include the introduction of hydrophilic properties due to the carboxyl groups, an upset in the cationic/anionic ratio when a cationic starch base is used (as in most papermaking wet end uses), and the possible formation of salts (in the above papermaking end use) which could give rise to ionic crosslinking.

The non-oxidative methods typically involve the reaction of the polysaccharide with an aldehyde-containing reagent. See U.S. Pat. No. 3,519,618 (issued July 7, 1970 to S. M. Parmerter) and U.S. Pat. No. 3,740,391 (issued June 19, 1973 to L. L. Williams et al.) which cover starch derivatives and U.S. Pat. No. 2,803,558 (issued Aug. 20, 1957 to G. D. Fronmuller) which covers a gum derivative. The starch derivative of Parmerter is prepared by reaction with an unsaturated aldehyde (e.g., acrolein) and has the structure Starch-O—CH($R^1$)—CH($R^2$)—CHO where $R^1$ and $R^2$ are hydrogen, lower alkyls or halogen. The starch derivative of Williams is prepared by reaction with acrylamide followed by reaction with glyoxal and has the structure

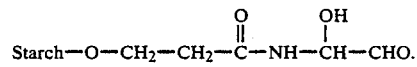

The gum derivative of Fronmuller is prepared by treating the dry gum (e.g., locust bean or guar gum) with peracetic acid to reduce the viscosity, neutralizing, and then reacting with glyoxal. Water-soluble cellulose ethers (e.g., hydroxyethylcellulose) have also been reacted with glyoxal or ureaformaldehyde to give aldehyde-containing derivatives.

One of the disadvantages of introducing the aldehyde groups directly using an aldehyde-containing reagent is the possibility of the derivative crosslinking prior to use. The Williams patent (cited above) alludes to this problem when it notes that solutions of the glyoxalated polymers "are stable for at least a week when diluted to 10% solids by weight and adjusted to pH 3" (see Col. 3, lines 60–63). The Parmerter patent notes that the starch aldehyde is "a substantially non-crosslinked granular starch derivative" and discusses the importance of the non-crosslinked character (see Col. 2, lines 40–45).

The crosslinking of a starch derivative containing two or more aldehyde groups (e.g., dialdehyde starch) with compounds containing two or more isocyanate groups (e.g., polymethylenepolyphenylene polyisocyanate) provides a water-resistant adhesive composition. See Japan. Kokai 57-202,362 published Dec. 11, 1982, Hohnen Oil Co., Ltd. (C.A. 98: 200152m 1983). The crosslinking of dialdehyde starch with an alkylene diamine such as an aliphatic diamine (e.g., hexamethylene diamine), and/or an aromatic alkylene diamine (e.g., methylene dianiline) is disclosed in U.S. Pat. No. 3,706,633 issued Dec. 19, 1972 to E. Katchalski et al. However, the crosslinking cannot be controlled because the granular dialdehyde starch is reactive toward the starch hydroxyls, thus leading to premature self-crosslinking rather than crosslinking via the diisocyanate or diamine.

Polysaccharides modified with acetals, such as dimethoxyethyl methyl chloroacetamide (DMCA), as described in Ser. No. 758,634 (cited previously), have been shown to possess some very unique properties. Once the polysaccharide is dispersed and the acetal is converted to aldehyde by lowering the pH to less than 7, crosslinking can occur between the aldehyde and any available hydroxyl group. This system is extremely effective as a strength additive in paper where the aldehydes can crosslink the fibers through the cellulose hydroxyls. The main drawback of these aldehydes is their tendency to crosslink the supporting polysaccharide backbone, as evidenced by a large increase in viscosity of a dispersion at greater than 5% non-converted starch solids. This makes their use in coating and adhesive applications, where high solids are required, impractical.

There is therefore a need for an aldehyde system that is non-reactive towards the hydroxyls on the polysaccharide backbone and which will crosslink when desired.

The particular adhesive employed in the corrugating process is selected on the basis of several factors, including the type of bond required in the final application of the finished corrugated product. Starch-based adhesives are most commonly used due to their desirable adhesive properties, low cost and ease of preparation.

It is often desired or necessary in the manufacture of corrugated paperboard that the adhesive yield water-resistant bonds which can withstand extended exposure to high humidity, liquid water, melting ice and the like. A number of approaches have been devised to produce water-resistant corrugating adhesives. One method involves the preparation of an acidic, starch-based adhesive wherein urea-formaldehyde resin is added to the composition, together with an acidic catalyst such as aluminum sulfate, to produce water-resistant bonds in the corrugated board manufactured therewith. The adhesive composition itself, however, is deficient in other important properties such as corrugator bonding speeds, viscosity stability, and pot life and exhibits excessive formaldehyde odor. In addition, acidic corrugating adhesives tend to be corrosive.

The many disadvantages associated with the acidic corrugating adhesives led to the development of water-resistant alkaline curing starch-based adhesives for use in the corrugating industry. In the preparation thereof, a thermosetting resin, such as, e.g., ureaformaldehyde, resorcinol-formaldehyde, melamine-formaldehyde, phenolformaldehyde, acetone-formaldehyde, ketone-aldehyde and urea-acetone-formaldehyde condensate, has been added to the adhesive as a cross-linking additive for the amylaceous components to produce water-resistant bonds.

In using thermoset resins of the type mentioned above, crosslinking occurs immediately upon addition of the resin. This causes thickening of the cooked portion and inhibition of the uncooked portion, both of which result in poor speeds on the corrugator after the adhesives age for a number of hours.

The corrugating industry is still searching for means for providing water resistance to corrugated paperboard products prepared from alkaline curing starch-based adhesives which are formaldehyde-free and which do not crosslink immediately.

SUMMARY OF THE INVENTION

The present invention provides polysaccharide ether derivatives wherein an aldehyde group is present on an aromatic ring of the ether substituent of the derivative, with the derivative having the formula

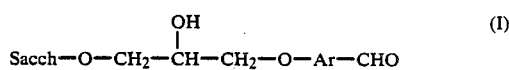

or Sacch-O—CH$_2$—Ar—CHO (II). It also provides an acetal-containing polysaccharide ether derivative which has the formula

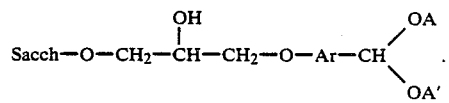

It further relates to a crosslinked product having the structure

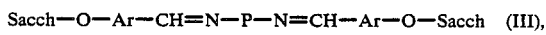

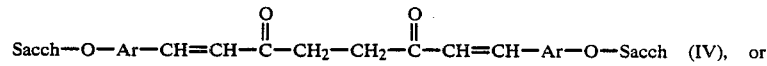

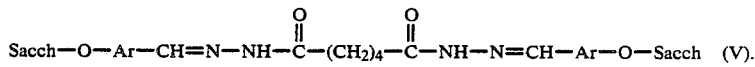

In the above formulas Sacch-O— represents a polysaccharide molecule (wherein the hydrogen of a hydroxyl group of a saccharide unit has been replaced as shown); Ar is a divalent aryl group which can contain an ether linkage, or an alkaryl group; A and A' are independently a lower alkyl or A and A' together form at least a 5-membered cyclic acetal and P represents a divalent group. As used herein, the term alkaryl is intended to denote a divalent group linked to the polysaccharide through the alkyl portion of the alkaryl group and linked to the aldehyde (—CHO) group or acetal group

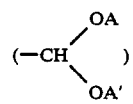

through the aromatic portion of the alkaryl group, and the term aromatic ring is intended to include not only conjugated hydrocarbons but also conjugated heterocyclic systems. The polysaccharide molecule may be modified by the introduction of cationic, anionic, nonionic, amphoteric, and/or zwitterionic substituent groups. As used herein, the terms "cationic" and "anionic" are intended to cover cationogenic and anionogenic groups.

The aromatic aldehydes of formula I are prepared by hydrolyzing the corresponding acetal at a pH of less than 7, preferably 5 or less, most preferably 2-3. The acetals are prepared by reacting the polysaccharide with an acetal reagent having the general structure

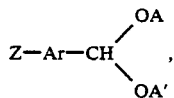

where Z is an organic group capable of reacting with the saccharide molecule to form an ether derivative and selected from the group consisting of an epoxide, a halohydrin, an ethylenically unsaturated group, or a reactive halogen.

A typical reagent is as follows:

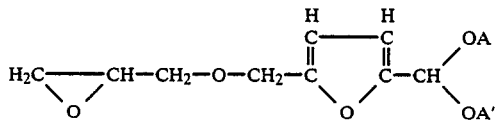

It can be prepared by converting an alcohol-containing aldehyde (e.g., 5-hydroxymethyl furfuraldehyde) to the acetal by treatment with an excess of an anhydrous alcohol (e.g., methanol) in the presence of a trace amount of an acid. The acetal is then reacted with an epihalohydrin (e.g., epichlorohydrin) under conditions that will not affect the acetal group (i.e., under alkaline conditions). The epihalohydrin reaction is described in an article by R. Pozniak and J. Chlebicki entitled "Synthesis of Higher N-(2-Hydroxy-3-alkoxypropyl) ethanolamines and N-(2-Hydroxy-3-alkoxypropyl)diethanolamines", Polish J. Chem. 52, p. 1283 (1978).

The aromatic aldehydes of the formula II are prepared by the chloromethylation of an aromatic aldehyde and the subsequent derivatization of a polysaccharide with the reaction product. The chloromethylation procedure described in C.A. 31, 7412: 6 (1937) is suitable for the chloromethylation of o-anisaldehyde and m-nitrobenzaldehyde. The procedure is modified in that concentrated hydrochloric acid is used rather than dry hydrogen chloride gas. For example, a mixture of o-anisaldehyde aldehyde, concentrated hydrochloric acid, and p-formaldehyde is stirred for 48 hours at room temperature, the precipitated product is filtered off, and the resulting product is washed with a sodium bicarbonate solution (0.5%) and then with distilled water until neutral, and dried in vacuum. The choromethylation of benzene and naphthalene are carried out in a similar manner as described in Organic Reactions, edited by Roger Adams, Vol. I, pp. 67 and 70, John Wiley and Sons, Inc., New York 1942.

The crosslinked products are prepared by dispersing the aldehyde-containing polysaccharide derivative in water and reacting the dispersed polysaccharide with an effective amount of a multifunctional crosslinker. When used with the polysaccharide derivative as a paper additive, the amount used is typically about 0.5 to 100% by weight, preferably 50%, based on polysaccharide. When used with the starch derivative in a corrugating adhesive, the amount used is typically 0.5–10%, based on starch. When the crosslinker is an aliphatic polyamine (containing at least two primary amine groups), a polyhydrazine, a polyhydrazide, a polysemicarbazide, or a polythiol, the pH at which the aldehyde-containing derivative is crosslinked is typically about 2.5 to below about 13. When the crosslinker is a cyclic or noncyclic polyketone, the pH must be above 11. The crosslinked products may also be prepared using the acetal-containing polysaccharide and the polyamine crosslinker; however, the pH must then be about 2 to 9.

The aldehyde-containing and aetal-containing polysaccharide derivatives are useful in conventional applications where water-soluble or water-swellable polysaccharide derivatives are useful, for example, as coatings, adhesives, and paper and textile additives. When used as a paper additive, the derivatives, typically contain cationic and cationogenic groups in addition to the aldehyde groups. These include diethylaminoethyl ether groups introduced by reaction with 2-diethylaminoethyl chloride hydrochloride (DEC) or 3-(trimethylammonium chloride)-2-hydroxylpropyl ether groups introduced by reaction with 3-chloro-2-hydroxypropyl trimethylammonium chloride. The polysaccharides modified with the aromatic acetal reagents are unique in that conversion to the aldehyde, by cooking at pH 2.5, does not cause the increase in viscosity typically seen with polysaccharides modified with aliphatic acetal reagents e.g., an amioca starch modified with N-(2,2-dimethoxyethyl)-N-methyl-2-chloroacetamide (DMCA).

The controlled reactivity of the polysaccharide derivatives containing the aromatic aldehydes offers some very important advantages. Since the viscosity does not increase, no restriction is placed on the percent solids used and crosslinking can be carried out when desired, e.g., to impart water resistance and strength by the addition of multifunctional materials capable of crosslinking with the aromatic aldehydes or aromatic acetals. Suitable crosslinkers include aliphatic polyamines containing primary amine groups, cyclic and noncyclic polyketones, polyhydrazines, polyhydrazides, polysemicarbazides, polythiols and the like. Aromatic polyamines do not crosslink with the aldehydes, nor do aliphatic secondary amines. The polyketones only crosslink at a high pH (>11).

The use of this modified uncooked starch in a corrugating adhesive eliminates any potlife considerations since the reaction with the crosslinker only occurs when the modified starch gelatinizes during the bonding operation and not before. Further, the crosslinking mechanism is not based on formaldehyde chemistry as are most of the thermoset resins used in corrugating adhesives and hence there is no release of formaldehyde vapors during preparation or use.

DESCRIPTION OF THE PREFERRED EMBODIMENTS

When the polysaccharide is starch, applicable starch bases which may be used herein may be derived from any plant source including corn, potato, sweet potato, wheat, rice, sago, tapioca, waxy maize, sorghum, high amylose corn, or the like. Starch flours may also be used as a starch source. Also included are the conversion products derived from any of the former bases including, for example dextrins prepared by the hydrolytic action of acid and/or heat; oxidized starches prepared by treatment with oxidants such a sodium hypochlorite, fluidity or thinboiling starches prepared by enzyme conversion or mild acid hydrolysis; and derivatized and crosslinked starches. The starch base may be a granular starch or a gelatinized starch, i.e. non-granular starch.

When the polysaccharide is gum, applicable bases which may be used herein are polygalactomannans, which are heteropolysaccharides composed principally of long chains of 1→4 β-D-mannopyranosyl units to which single unit side chains of α-D-galactopyranosyl units are joined by 1→6 linkages and hereafter referred to as "gums". Also included are degraded gum products resulting from the hydrolytic action of acid, heat, shear, and/or enzyme; oxidized gums; and derivatized gums. The preferred gums include gum arabic, as well as guar gum and locust bean gum because of their commercial availability.

When the polysaccharide is cellulose, applicable bases useful herein include cellulose and cellulose derivatives, especially water-soluble cellulose ethers such as alkyl and hydroxylalkyl celluloses, specifically methylcellulose, hydroxypropylmethyl cellulose, hydroxybutylmethylcellulose, hydroxyethylmethylcellulose, and ethylhydroxyethylcellulose.

Methods for preparing the modified polysaccharide bases are well-known to those skilled in the art and discussed in the literature. See, for example, R. L. Whistler, Methods in Carbohydrate Chemistry, Vol. IV, 1964, pp. 279–311; R. L. Whistler et al., Starch-Chemistry and Technology, Vol. II, 1967, pp. 293–430; R. L. Davidson and N. Sittig, Water-Soluble Resins, 2nd Ed., 1968, Chapter 2; and R. L. Davison, Handbook of Water-Soluble Gums and Resins, 1980, Chapters, 3, 4, 12 and 13 directed to cellulose derivatives, Chapters 6 and 14 directed to gums, and Chapter 22 directed to starch.

The starch reactions with the derivatizing reagents that introduce the acetal groups are carried out using the general procedure described in U.S. Pat. No. 3,880,832 issued Apr. 29, 1975 to M. M. Tessler. Granular reactions are typically carried out in water at 20°–50° C., preferably about 40°–45° C. Non-granular starch reactions may be carried out at higher temperatures (e.g., up to 100° C.). The reaction mixture is preferably agitated. Reaction time may vary from about 0.5–40 hours, preferably 8–24 hours, for aqueous reactions or from about 1–8 hours for reactions carried out in a substantially dry reaction medium. It will depend on such factors as the amount of reagent employed, the temperature, the scale of the reaction, and the degree of substitution desired. The pH is maintained at about 10–13, preferably 11–12, during the reagent addition and during the entire reaction using a base such as sodium, potassium, or calcium hydroxide. Sodium sulfate is typically added to the reaction mixture to reduce swelling of the granular starch; it is not used when calcium hydroxide is the base. Potassium or sodium iodide is a good catalyst for reacting the chloroacetylated amine derivatives, but it is not necessary for a satisfactory reaction with the starch. After completion of the reaction, the excess alkali is neutralized and the pH adjusted to about 4–8, preferably 7–8, using any conventional acid prior to recovery of the starch.

The gum reactions with the acetal reagents are carried out in a two-phase reaction system comprising an aqueous solution of a water-miscible solvent and the water-soluble reagent in contact with the solid gum. The water content may vary from 10 to 60% by weight depending upon the water-miscible solvent selected. If too much water is present in the reaction system, the gum may swell or enter into solution thereby complicating recovery and purification of the derivative. The water-miscible solvent is added in the amount sufficient for the preparation of a slurry which can be agitated and pumped. The weight ratio of water-miscible solvent to gum may vary from 1:1 to 10:1, preferably from 1.5:1 to 5:1. Suitable water-miscible solvents include alkanols, glycols cyclic and acrylic alkyl ethers, alkanones, dialkylformamide and mixtures thereof. Typical solvents include methanol, ethanol, isopropanol, secondary pentanol, ethylene glycol, acetone, methylethylketone, diethyl-ketone, tetrahydrofuran, dioxane, and dimethylformamide. The reaction times and temperatures used for the aqeuous reactions are suitable for the solvent reaction.

The cellulose reactions with the acetal reagents are conveniently carried out using the procedure of U.S. Pat. No. 4,129,722 (issued Dec. 12, 1978 to C. P. Iovine et al.) The cellulose or cellulose derivative is suspended in an organic solvent and a water solution of the derivatizing reagent is added thereto. Derivatization in the resultant two-phase mixture is ordinarily carried out with agitation at temperatures of 30° to 85° C., adding alkali if necessary to effect reaction. At least one of the initial phases (i.e., the suspended celulose or cellulose derivative or the aqueous reagent solution) contains a suitable surfactant. It is important that the organic solvent used in the initial cellulose phase be immiscible with the aqueous derivatizing reagent phase, that it not dissolve the cellulose derivative as it is formed, that it have a boiling point at or above the temperature of the derivatizing reaction, that it be insensitive to alkali and not participate in the derivatization reaction.

The two phase procedure may also be used to prepare starch or gum derivatives as well as cellulose derivatives. It may also be used to prepare derivatives containing substituents derived from different reagents without isolating the substitution product from each reagent. This multiple substitution may be accomplished by the addition of several different reagents to the substrate-surfactant alkali mixture at the same time or sequentially.

After completion of the acetal reaction the solid polysaccharide acetals may be separated, if desired, from the reaction mixture by centrifugation or filtration. Preferably, the derivative is purified by washing in a solvent in which the reagent is soluble and the polysaccharide insoluble. In the case of starch derivatives, water and/or a solvent are used. In the case of the gum derivatives, a solvent is used. In the case of the cellulose derivatives, an aqueous solution of water-miscible solvent is used. Further washing with a more anhydrous form of the same solvent may be desired for the gum derivatives. The derivatives are then dried using conventional methods, as in a vacuum, drum, flash, belt, or spray drier. If the polysaccharide is in solution when derivatized, other methods of purification will have to be used, e.g. precipitation.

The conversion of the polysaccharide acetals to the aldehydes is carried out under acidic conditions, typically at a pH of 7 or less, preferably 5 or less, most preferably at about 2–3. It may be carried out directly without isolation of the acetal or the acetal may be isolated as above and resuspended in water prior to conversion. If desired, the derivatives may be recovered as described above.

In addition to preparing the above acetals or aldehydes, modified derivatives may be prepared which contain other substituent groups, hydroxyalkyl groups (e.g., hydroxypropyl ether groups), carboxyalkyl ether groups (e.g., carboxymethyl), ester groups (e.g., acetate groups), tertiary amino groups (e.g., diethylaminoethyl ether groups), and quaternary amine groups, (e.g. 3-(trimethylammonium chloride)-2-hydroxypropyl groups or 4-(trimethylammonium chloride)-2-butenyl groups), introduced prior to or subsequent to reaction with the acetal derivatizing reagent or introduced simultaneously by reaction with the acetal reagent and other derivatizing reagent. The practitioner will recognize that reactions with reagents introducing labile ester groups should be carried out after the other derivatizations to avoid ester hydrolysis under the alkaline conditions used to prepare other derivatives.

The aldehyde derivatives used as paper additives preferably contain cationic groups, such as the quaternary ammonium and tertiary amine group discussed above, amphoteric, and/or zwitterionic groups. These derivatives are dispersed in water before use. The granular starch derivatives are cooked to provide the dispersed derivative.

The starch may be cooked prior to derivatization to form the acetal, subsequent to derivatization, after conversion to the aldehyde, or most conveniently during conversion of the acetal to the aldehyde. Cooking at a pH of less than 7 simultaneously converts the acetal to aldehyde and solubilizes and disperses the starch aldehyde. Any conventional cooking procedure may be used, such as cooking a slurry containing the water-soluble or water-swellable derivative in a boiling water bath for about 20 minutes, blowing in steam to heat the slurry at about 93° C. (200° F.), or jet cooking. If a water-dispersible or water-soluble starch base is used for the prepration of the acetal, it will not be necessary to cook the acetal during the acid hydrolysis.

Crosslinking of the aldehyde groups may be affected using polyamines ranging in molecular weight from the low molecular weight diethylene triamine (about 100) to the high molecular weight polyethyleneimines (about 100,000). The acetal-modified polysaccharides, e.g., starch, are cooked at pH 2.5 for about twenty minutes to convert the acetal to the aldehyde and disperse the polysaccharide. Crosslinking occurs as the polyamine (typically 0.1–1 g. of polyamine per 100 g. of the aldehyde-containing polysaccharide) is being added to the polysaccharide cook, but it occurs more rapidly at higher temperatures. The pH range at which the polysaccharide aldehyde crosslinking occurs is between about 2.5 to 13.

Under certain conditions (i.e., between pH 2.5 and 9.0) the polysaccharide acetal will crosslink upon the addition of the polyamine. The polyaccharide acetal is cooked at pH 7 and cooled prior to the polyamine addition. Above pH 9.0, no crosslinking of the dispersed polysaccharide acetal occurs even after 24 hours.

Crosslinking may also be effected using polyketones, e.g., 2,5-hexanedione. The polysaccharide acetal is cooked at pH 2.5 to disperse the starch and convert the acetal groups to the aldehydes. The pH is then adjusted to 12–13 and a small amount of the diketone (about 0.5 g.) is added. Crosslinking occurs rapidly if the diketone is added to the hot polysaccharide. It occurs more slowly if the polysaccharide is allowed to cool before the addition of the diketone.

Three methods are available for controlling the crosslinking process. The first involves adding the polyamine to a stable dispersion of the cooked aldehyde-containing polysaccharide at the time of use. For example, the dispersion is added to the pulp in the wet end and the polyamine is added (such as at the head box). It is thus possible to afford permanent wet strength, wet web strength, and dry strength.

The second method involves protecting the polyamine, e.g., by encapsulating it in a starch matrix. The encapsulated polyamine is added to the dispersed polysaccharide (i.e., cooked at pH 2.5). The dispersion shows very little change in viscosity until the mixture is placed in a boiling water bath. Upon heat the encapsulating material swells releasing the polyamine. A very firm gel (indicating crosslinking) forms in several minutes. If the mixture is not heated, but allowed to stand overnight, a slight release of the polyamine causes some crosslinking.

The third method involves protecting the aldehydes by converting the acetal to the aldehyde while still in the granular form (i.e., without dispersing the polysaccharide by cooking it). Polysaccharides containing aliphatic aldehydes are so inhibited (i.e., crosslinked) that they can not be dispersed by cooking. The polysaccharides containing the aromatic aldehydes can be readily dispersed by cooking. The presence of the aldehyde can be demonstrated by cooking the aldehyde-containing polysaccharide and then adding the polyamine. A gel forms almost instantly. A cook of the polysaccharide containing the acetal groups shows no change upon addition of polyamine.

It is assumed that high molecular weight polyethyleneimine (molecular weight of 45,000 to 100,000) cannot penetrate the surface of the starch granule. There is spectroscopic data which suggests that the polyethyleneimine exists as a spheroid type structure, which if big enough, will not be capable of fitting through the pores on the surface of the granule. If the high molecular polyethyleneimine is mixed with an aromatic aldehyde-containing starch in the granule form and the mixture is cooked in a boiling water bath, the starch will begin to disperse and then gel (i.e., crosslink). If a lower molecular weight polyamine is used, penetration and crosslinking occurs before the starch can be completely dispersed. The minimum molecular weight necessary to prevent penetration into the granule will depend on variables such as the starch base used, pH, temperature, salt content, and the like.

The polysaccharide aldehyde derivatives described herein may be used as beater additives, although their addition to the pulp may occur at any point in the paper-making process prior to the ultimate conversion of the wet pulp into a dry web or sheet. Thus, for example, they may be added to the pulp while the latter is in the hydropulper, beater, various stock chests, or headbox. The derivatives may also be sprayed onto the wet web. If the derivative is trapped in the wet fibers after spraying, it may not be necessary to use cationic derivatives but they are preferred.

The aldehydes herein may be effectively used for addition to pulp prepared from any type of cellulosic fibers, synthetic fibers, or combinations thereof. Among the cellulosic materials which may be used are bleached and unbleached sulfate (Kraft), bleached and unbleached sulfite, bleached and unbleached soda, neutral sulfite, semi-chemical chemiground wood, ground wood or any combination of these fibers. Fibers of the viscous rayon or regenerated cellulose type may also be used if desired.

Any desired inert mineral fillers may be added to the pulp which is to be modified with the aldehydes herein. Such materials include clay, titanium dioxide, talc, calcium carbonate, calcium sulfate and diatomaceous earths. Rosin or synthetic internal size may also be present if desired.

The proportion of the aldehyde to be incorporated into the paper pulp may vary in accordance with the particular pulp involved and the properties desired (e.g., wet strength, temporary wet strength, or dry strength). In general, it is preferred to use about 0.1-15%, preferably about 0.25-5% of the derivative, based on the dry weight of the pulp. Within this preferred range the precise amount which is used will depend upon the type of pulp being used, the specific operating conditions, the particular end use for which the paper is intended, and the particular property to be imparted. The use of amounts greater than 5%, based on the dry weight of the pulp, is not precluded, but is ordinarily unnecessary in order to achieve the desired results.

In granular form the aromatic aldehyde derivartives herein are particularly useful as the granular portion of the corrugating adhesive. The most fundamental of starch corrugating adhesives is an alkaline adhesive which is comprised of raw ungelatinized starch suspended in an aqueous dispersion of cooked starch. The adhesive is produced by gelatinizing starch in water with sodium hydroxide (caustic soda) to yield a primary mix of gelatinized or cooked carrier starch, which is then slowly added to a secondary mix of raw (ungelatinized) starch, borax and water to produce the full-formulation adhesive.

The gelatinized carrier starch portion of the adhesive composition herein may be selected from any of the several starches, native or converted, typically employed in starch corrugating adhesive compositions. Suitable starches include, for example, those starches derived from corn, potato, waxy maize, sorghum, wheat, as well as high-amylose starches, i.e., starches which contain 30% or more by weight of amylose, and the various derivatives of these starches. Hence, among the applicable starches are included the various starch derivatives such as ethers, esters, thin-boiling types prepared by known processes such as mild acid treatments, oxidation, and the like and those derivatives of these starches which have high amylose contents. The preferred starches are those typically employed in corrugating adhesives of the alkaline type.

The starch content of the adhesive can vary considerably depending on several factors such as the intended end-use application and the type of starch used. The total amount of starch employed, including the gelatinized and ungelatinized portions of starch, ordinarily will be in the range of about 10-40% by total weight of the adhesive.

The remainder of the adhesive composition is composed of about 0.3-5% of an alkali such as sodium hydroxide, based on total weight of starch, and about 54-89% of water, based on total weight of the adhesive. The preferred amounts of all ingredients are 10-35% starch, 1-4% alkali, and 60-80% water. The alkali (base) employed herein is preferably sodium hydroxide; however, other bases may be employed in partial or full replacement of the sodium hydroxide and include, e.g., alkali metal hydroxides such as potassium hydroxide, alkaline earth hydroxides such as calcium hydroxide, alkaline earth oxides such as barium oxide, alkali metal carbonates such as sodium carbonate, and alkali metal silicates such as sodium silicate. The alkali may be employed in aqueous or solid form.

In the corrugating process, the adhesive is applied (usually at between 25° and 55° C.) to the tips of the fluted paper medium or single-faced board, whereupon the application of heat causes the raw starch to gelatinize, resulting in an instantaneous increase in viscosity and formation of the adhesive bond. The procedures employed in the production of corrugated paperboard usually involve a continuous process whereby a strip of paperboard is first corrugated by means of heated, fluted rolls. The protruding tips on one side of this fluted paperboard strip are then coated with an adhesive, and a flat sheet of paperboard, commonly known in the trade as a facing, is thereafter applied to these tips. By applying heat and pressure to the two paperboard strips thus brought together, an adhesive bond is formed therebetween. The above-described procedure produces what is known to those skilled in the art as a single-faced board in that the facing is applied to only one surface thereof. If a double-faced paperboard is desired, in which an inner fluted layer is sandwiched between two facings, a second operation is performed wherein the adhesive is applied to the exposed tips of the single-faced board and the adhesive-coated tips are then pressed against a second facing in the combining section of the corrugator under the influence of pressure and heat. The typical corrugating process and the use of operation of corrugators in general are described in U.S. Pat. Nos. 2,051,025 and 2,102,937 issued on Aug. 18, 1936 and Dec. 21, 1937, respectfully to Bauer.

It can be appreciated by the practitioner that a large number of variations may be effected in selecting the acetal derivatizing reagents, reacting them with the bases, converting them to the aldehydes, and utilizing the aldehyde derivatives as paper wet end additives or in corrugating adhesives in accordance with the procedure described above without materially departing from the scope and spirit of the invention. Such variations will be evident to those skilled in the art and are to be included within the scope of the invention.

In the examples which follow, all parts and percentages are given by weight and all temperatures are in degrees Celsius unless otherwise noted. Reagent percentages are based on dry polysaccharide.

The nitrogen content of the cationic bases and resulting acetals was measured by the Kjeldahl method and is based on dry polysaccharide. The presence of aldehyde groups are determined qualitatively by the viscosity increase of a cooked slurry and/or gel formation upon the addition of the crosslinking agent and quantitatively by titration. The quantitative test is carried out by slurrying 5.0 g. of the polysaccharide acetal in sufficient distilled water to give 500 g. The pH is adjusted to 2.5 with hydrochloric acid. The polysaccharide is dispersed by cooking in a boiling water bath for 20 min. The dispersed polysaccharide is cooked and the solids determined. A 100 g. portion of the polysaccharide dispersion is weighed out, titrated with 0.1 NaOH to the first end point (inflection point is between pH 4 and 5) and the ml. of NaOH required is recorded ($T_1$). An aqueous solution (50 ml.) of hydroxylamine hydrochloride (prepared by dissolving 34.75 g. of the hydroxylamine hydrochloride in 1000 ml. volumetric flask and diluting to the mark with water) is added to a 100 g. portion of the polysaccharide dispersion, heated at reflux for 60 min., and titrated with 0.1N NaOH to pH 4.5.

The ml. of NaOH required to reach the inflection point (pH 3.0–3.5) is recorded ($T_2$).

$$\% \text{ aldehyde} = \frac{(T_2 - T_1) \times (\text{normality of NaOH}) \times (2.9)}{\text{polysaccharide weight*}}$$

*polysaccharide weight =

100 g. × % solids of dispersed polysaccharide

Best results are obtained using an automatic titrator. A blank of base polysaccharide (i.e., unmodified by the introduction of acetal groups) may also be run.

In the paper tests, the tensile strengths are reported as breaking length (m.). The breaking length is the calculated limiting length of a strip of uniform width, beyond which, if such as strip were suspended by one end, it would break of its own weight. The breaking length (air dry) in meters (m.) is calculated using the formula B.L.=102 000(T/R)=3,658(T'/R'), where T is tensile strength in kN./m., T' is tensile strength in lb./in., R is grammage (air dry) in g./m.², and R' is weight per unit area (air dry in lb./1000 ft.²). Paper specimens are selected in accordance with TAPPI T 400 sampling procedure. Those evaluated for wet strength and temporary wet strength were saturated with distilled water by immersion and/or soaking until the paper sample was thoroughly wetted. The strength was evaluated in accordance with TAPPI T 494 om-82. The measurements were carried out using a constant rate of elongation apparatus, i.e., a Finch wet strength device, which is described in TAPPI Procedure T 465 om-82 (1982). The dry strength was evaluated in accordance with TAPPI T 494 om-81.

EXAMPLE I

This example describes the preparation of an acetal-containing derivative having the structure

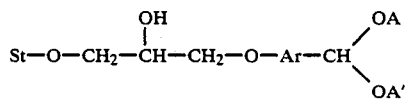

and an aldehyde derivative having the structure

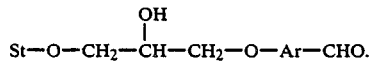

Part A

Preparation of 5-Hydroxymethyl Furfuraldehyde Dimethyl Acetal

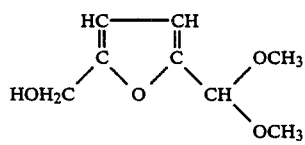

A total of 5.0 g. (0.039 mole) of 5-hydroxymethyl furfuraldehyde was dissolved in 150 ml. of anhydrous methanol and placed in 250 ml. round bottom flask equipped with magnetic stir bar and drying tube. One drop of concentrated hydrochloric acid was added and the solution was allowed to stir overnight. The reaction mixture was then neutralized with sodium carbonate, filtered, and the solvent removed under vacuum. The resulting red-brown oil was determined by NMR to be 98% acetal.

Part B

Modification of The 5-Hydroxymethyl Furfuraldehyde Dimethyl Acetal with Epichlorohydrin A total of 6.0 g. (0.035 mole) of 5-hydroxymethyl furfuraldehyde dimethyl acetal (HMFA) was added to 1.54 g. sodium hydroxide (0.038 mole) in a 100 ml. round bottom flask equipped with magnetic stir bar, reflux condenser, and nitrogen inlet. After stirring for 30 mins., 3.89 g. (0.042 mole) of epichlorohydrin in 50 ml. of methyl ethyl ketone was added quickly, and the reaction mixture was allowed to reflux overnight under a nitrogen atmosphere. The resulting oil was mixed with 250 ml. of toluene, and the toluene was then distilled off at atmospheric pressure to remove any residual epichlorohydrin. The sample was freed of toluene by subjecting it to high vacuum overnight.

Part C

Preparation of The Acetal-Containing Starch Derivatives

The following procedure was used to prepare the starch derivatives. A solution of 9.0 g. sodium sulfate (36% based on starch) was dissolved in 40 ml. of distilled water and 0.375 g. sodium hydroxide (1.5% based on starch) was dissolved in the salt solution. A total of 25 g. of starch was added quickly and shaken to a uniform consistency. The indicated reagent was added and the container was sealed and placed in a tumbler and heated at 45° C. for 30 hours. The starch slurry was cooled to room temperature and adjusted to pH 7.5 with HCl. The starch was then filtered, washed three times with 100 ml. of water and twice with 100 ml. isopropanol, and air dried. It was analyzed by titration.

The reactions are summarized below:

| Cationic Starch Base* | Acetal Reagent (%) | NaOH (%) | Reaction Time (hr.) | CHO by Titration % |
|---|---|---|---|---|
| waxy maize | 10 | 2.25 | 6 | 0.16 |
| waxy maize | 10 | 2.25 | 18 | 0.50 |
| waxy maize | 10 | 2.25 | 30 | 0.88 |

*Treated with 3% dimethylaminoethyl chloride hydrochloride (DEC) prior to treatment with the acetal reagent. The DEC reaction was carried out according to the method described in Example III of U.S. Pat. No. 4,243,479 issued Jan. 6, 1981 to M. M. Tessler. The starch contained 0.27% N.

Part D

Preparation of The Aldehyde-Containing Starch Derivatives

The starch acetals were converted to the corresponding aldehydes by slurrying the acetal in water (e.g., 100 parts of water/1 part of starch) and adjusting the pH to 2.5–3.0 with a dilute solution of hydrochloric acid. The starch acetals were cooked in a boiling water bath, prior to, after, or during the acidification to gelatinize the starch. The total cooking time was about 20 mins. The slurry was stirred during the acid addition and/or initial cooking. The cook was cooled rapidly.

EXAMPLE II

The cellulose acetal and aldehyde was prepared from alpha-cellulose and 5-glycidoxy furfuraldehyde dimethyl acetal (GMFA) using 10% reagent on cellulose following the procedure described in Example I—Part C. The % CHO by titration was 0.15%.

EXAMPLE III

This example describes the preparation of an acetal-containing derivative having the structure

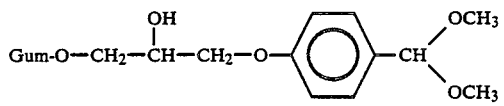

and an aldehyde-containing derivative having the structure

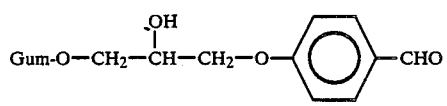

Part A

Preparation of 4-Glycidoxybenzaldehyde Dimethyl Acetal

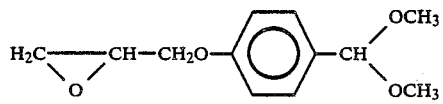

A 250 ml. three neck flask was equipped with magnetic stir bar, reflux condenser, addition funnel and nitrogen inlet. Dry nitrogen was swept through the apparatus while it was heated with a heat gun. After the apparatus was cooled, 5.95 g. of a 60% oil dispersion of sodium hydride (0.149 mole) was added and triturated three times with 25 ml. of petroleum ether to remove the oil. A solution of 36.6 g. (0.3 mole) 4-hydroxybenzaldehyde in 100 ml. of tetrahydrofuran was added dropwise to the sodium hydride over 30 mins. When the addition was complete, 1.1 g. (0.0003 mole) tert-butyl ammonium iodide was added along with 30.7 g. (0.33 mole) epichlorohydrin. The reaction mixture was refluxed overnight, cooled, filtered, and the solvent removed under vacuum. Excess epichlorohydrin was removed by azeotropic distillation using a ten fold excess of toluene. Yield was 40% of 4-glycidoxy benzaldehyde.

A total of 8.5 g. (0.0477 mole) of the above aldehyde and 8.5 g. (0.0574 mole) of triethylorthoformate was then added to a 50 ml. round bottom flask equipped with magnetic stir bar and reflux condenser. A solution of 0.25 g. (0.003 mole) ammonium nitrate was dissolved in 5 ml. of warm ethanol and added rapidly to the reaction mixture. The mixture was stirred for 6 hrs. at room temperature, neutralized with excess sodium carbonate, filtered, and the solvent removed under vacuum. The resulting oil (100% yield) had no residual aldehyde as determined by NMR. No further purification was needed.

Part B

Preparation of Guar Gum Acetal and Aldehyde

To 2 ml. of sodium hydroxide (20% solution) in a solution of 80% acetone/20% water were added 3.0 g. of 5-glycidoxymethyl furfuraldehyde dimethyl acetal (12% Reagent based on gum). Then 25 g. of guar gum was mixed in rapidly. The reaction mixture was refluxed for 4 hours, HCl was added quickly, and the product was filtered. The filter cake was washed three times with 100 ml. of acetone, then three times with 100 ml. of acetone/water (1:1), and finally three times with 100 ml. of acetone. The cake was air dried overnight and analyzed by titration. It contained 0.88% CHO as determined by titration.

EXAMPLE IV

The following charts show a list of the reagents (Chart A) which, when reacted, will give aromatic reaction products that can then be reacted with polysaccharides (e.g., starch, gum, and cellulose) using the indicated procedure polysaccharide shown in Chart B should result. Conversion to the polysaccharide aldehyde should occur upon acidification.

CHART A

| Reagents | Reaction Product |
|---|---|
| 2-hydroxy-1-Napthalene carboxaldehyde + NaH + Sodium Hydride + H₂C—CH—CH₂Cl Epichlorohydrin $\xrightarrow{(1)}$ | (I) |
| (I) + NH₄NO₃ Ammonium Nitrate + HC(OCH₃)₃ Trimethyl o-Formate $\xrightarrow{(2)}$ | |

CHART A-continued

| Reagents | Reaction Product |
|---|---|
| 3-hydroxy-4-pyridine carboxaldehyde + NaH + Epichlorohydrin (Sodium Hydride) (1) | (II) |
| (II) + NH₄NO₃ + HC(OCH₃)₃ (2) (Ammonium Nitrate) (Trimethyl o-Formate) | |
| 5-hydroxymethyl-2-thiophene carboxaldehyde + H⁺ + CH₃OH (3)→ (Hydrogen ion) (Methanol) | (III) |
| (III) + H₂C—CH—CH₂Cl + NaOH (4)→ (Epichlorohydrin) (Sodium Hydroxide) | |
| 5-hydroxymethyl-2-pyridine carboxaldhyde + H⁺ + CH₃OH (3)→ (Hydrogen Ion) (Methanol) | (IV) |
| (IV) + H₂C—CH—CH₂Cl + NaOH (4)→ (Epichlorohydrin) (Sodium Hydroxide) | |

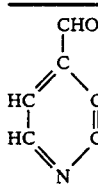

(1) Tetrahydrofuran, reflux 18 hrs.
(2) Methanol, 5° C. to room temperature, 4 hrs.
(3) Trace p-toluenesulfonic acid
(4) Methylethyl ketone, reflux 18 hrs.

CHART B

| Reaction Product | Polysaccharide Acetal |
|---|---|

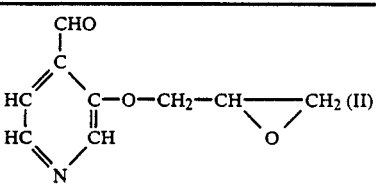

CHART B-continued

| Reaction Product | Polysaccharide Acetal |
|---|---|

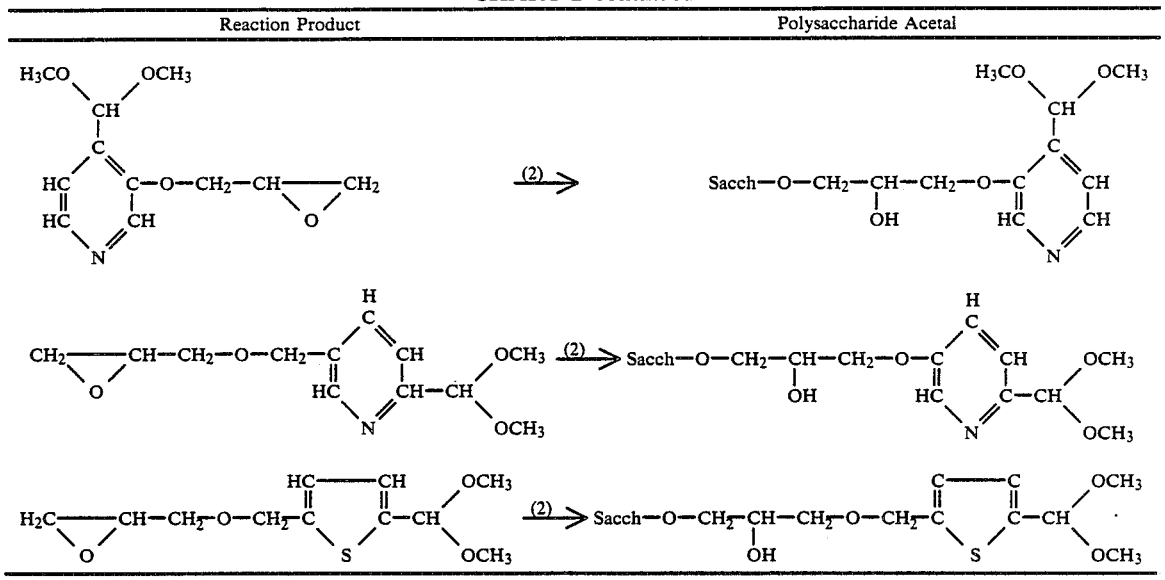

(1) Acetone, reflux 4 hrs., 2% NaOH based on polysaccharide
(2) Water, 24 hrs., 45° C., 2% NaOH based on polysaccharide, 30% Na₂SO₄ based on polysaccharide

EXAMPLE V

This example describes the direct preparation of an aldehyde-containing starch derivative.

Part A

Preparation of 5-Chloromethyl-2-Anisaldehyde (CMAA)

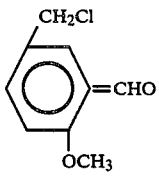

A total of 34 g (0.25 moles) of o-anisaldehyde was dried to a two-necked 250 ml. round bottom flask equipped with an overhead stirrer. To this was added 150 ml. concentrated HCl and 13.5 g. paraformaldehyde (0.15 moles). The reaction mixture was stirred at room temperature for 48 hrs. The precipitated benzyl chloride was filtered off, washed with water several times, resuspended in methylene chloride, washed with 100 ml. of 0.5% NaHCO₃ solution three times, and then with water until neutral. It was dried under vacuum. The yield was 87%. The $^{13}$C NMR and $^{1}$H NMR analyses were consistant with the above structure (C₉H₉O₂Cl).

Part B

Preparation of The Starch Derivative

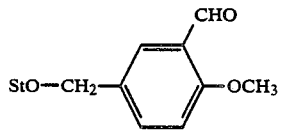

To a three necked 500 ml. round bottom flask equipped with a stirrer, heating mantel, and condenser were added 150 ml. distilled water, 30 g. sodium sulfate, and 0.8 g. sodium hydroxide (0.02 mole). The mixture was stirred for about 5 minutes, and 100 g. corn starch were added. The pH was about 11.5.

A total of 10 g. of the 5-chloromethyl-2-anisaldehyde was weighed in a 100 ml beaker and 45 ml. of tetrahydrofuran were added. The solution was added dropwise to the starch slurry with mixing. No pH change was observed after stirring for 10 min. at room temperature. The reaction mixture was heated to 50° C. The pH slowly dropped but was maintained above 11.0 by the slow addition of 3% NaOH. After 20 minutes the pH remained constant at 11.1–11.9. The slurry was maintained at 50° C. with stirring overnight. The starch was recovered by adjusting the pH to 7.0 with 3% HCl, filtering, resuspending the cake, and filtering three times using 200 ml. of water. The product was then washed twice with 200 ml. of acetone and air dried overnight.

EXAMPLE VI

This examples describes the direct preparation of an aldehyde-containing starch derivative by reaction of starch with 5-chloromethyl furfuraldehyde to give

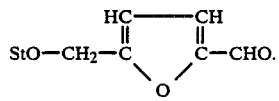

To a 1 l. three neck flask equipped with an overhead stirrer and additional funnel was added a slurry of 100 g. of corn starch in 190 ml of anhydrous acetone. Sodium hydroxide (2.5g.–0.0625 mole) was dissolved in enough water (10 ml) to account for 5% of the total solvent volume. The solution of sodium hydroxide was then added to the acetone slurry with vigorous stirring. Pure 5-chloromethyl furfuraldehyde (5.0 g.) (prepared according to the procedure described in the article "An Improved Method For The Conversion of Saccharides Into Furfural Derivative" by Kazuhiko Hamada et al.

reported in *Chemistry Letters*, pp. 617–618, 1982) was added quickly to the mixture and the mixture was allowed to stir overnight. The reaction mixture was then dumped into 1 l. of water at pH 3. The pH of this slurry, which was about 11.5, was adjusted to 7.0–8.0 with dilute HCl. The starch derivative was recovered by filtration, washed three times with 200 ml. of water, twice with 200 ml. of isopropanol, and then air dried. Analysis by titration showed 0.53% CHO (53% reaction efficiency).

the acetal was thus converted to the aldehyde. The results are shown in Table I.

CHART C

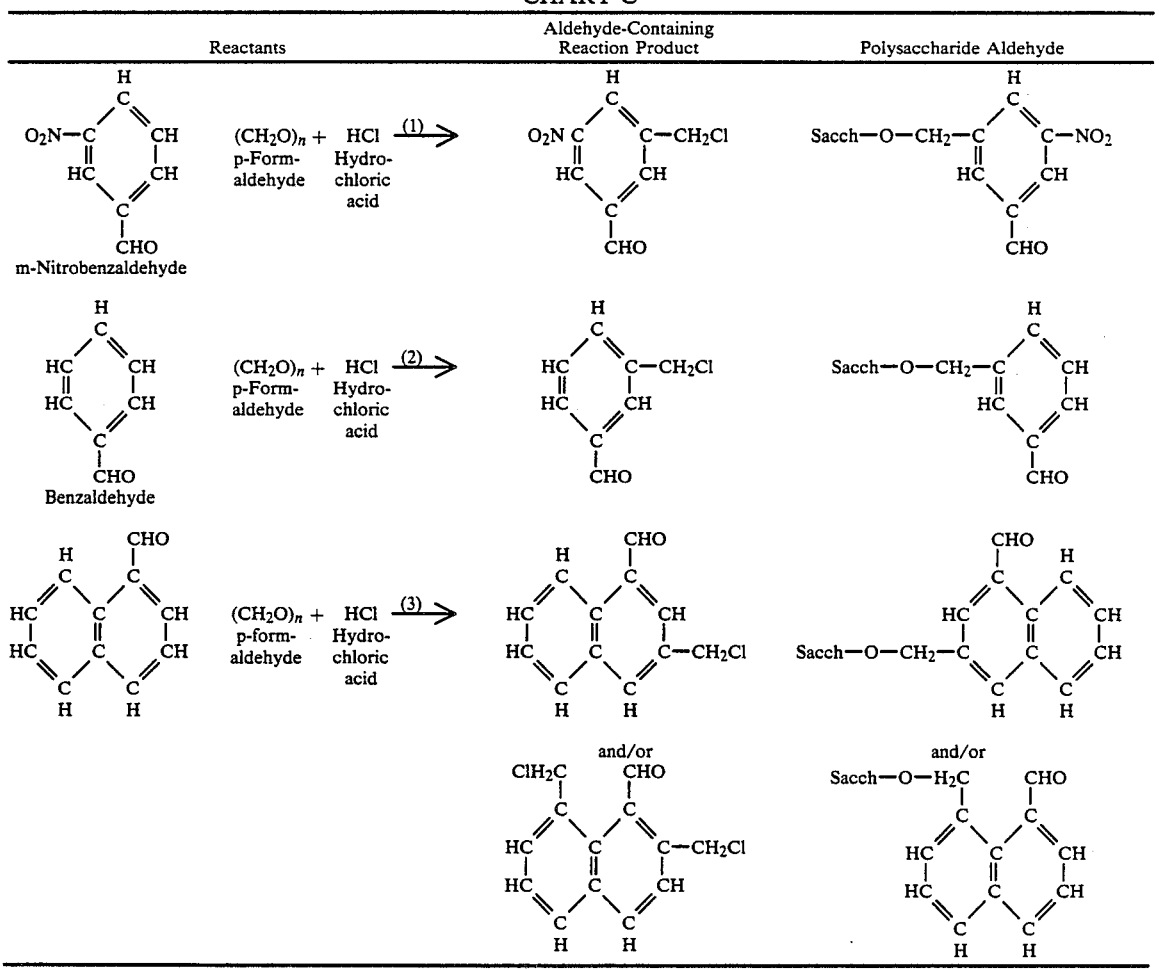

(1) Room temperature, 48 hrs.
(2) ZnCl$_2$, 60° C., 20 mins.
(3) H$_3$PO$_4$ syrupy, CH$_3$COOH glacial, 100° C., 4.5 hrs.

EXAMPLE VII

The following chart (C) shows a list of reactants which, when reacted, will give aromatic aldehyde-containing reagents of the type used in Example IV that can be reacted with polysaccharide (e.g., starch, gum, and cellulose). The indicated polysaccharide aldehyde should result.

EXAMPLE VIII

This example describes the crosslinking of the derivatives of Examples I, IV, and VI using various polyethyleneimines (PEI), diethylene triamine (DETA), 2,5-hexanedione (HD), and adipic dihydrazide (ADIH). The derivatives were cooked for 20 minutes at the indicated pH in a boiling water bath to disperse the starch. In the case of the GMFA derivatives cooked at pH 2.5

TABLE I

| Corn Starch Treated with | pH | Crosslinking Initiator | Appearance of Cook | | |
|---|---|---|---|---|---|
| | | | Initial | After Addition of Crosslinker | After Standing Overnight |
| GMFA | 2.5 | PEI (Mw=1200) | Creamy | Gel | Gel |
| GMFA | 2.5 | PEI (Mw=10,000) | Creamy | Gel | Gel |
| GMFA | 2.5 | PEI (Mw=60,000) | Creamy | Gel | Gel |
| GMFA | 2.5 | DETA | Creamy | Gel | Gel |
| GMFA | 2.5 | HD | Creamy | Creamy | Gel |
| CMAA | 2.5 | PEI (Mw=60,000) | Creamy | Gel | Gel |
| GMFA | 2.5 | ADIH | Creamy | Gel | Gel |
| GMFA | 7.0 | PEI (Mw=60,000) | Creamy | Gel | Gel |
| CMF | 7.0 | PEI (Mw 60,000) | Creamy | gel | Gel |
| GMFA | 9.0 | PEI (Mw=60,000) | Creamy | Gel | Gel |
| GMFA | 11.0 | PEI | Creamy | Creamy | Creamy |

TABLE I-continued

| Corn Starch Treated with | pH | Crosslinking Initiator | Initial | Appearance of Cook After Addition of Crosslinker | After Standing Overnight |
|---|---|---|---|---|---|
| (Mw=60,000) | | | | | |

GMFA indicates 5-glycidoxymethyl furfuraldehyde dimethyl acetal
CMAA indicates 5-chloromethyl-2-anisaldehyde
CMF indicates 5-chloromethyl-2-furfuraldehyde The results show that polyethyleneimines varying in molecular weight from 1200–60,000 were effective as crosslinkers as were diethylene triamine an adipic dihydrazide. The results also show that hexanedione was effective as crosslinker but that the crosslinking did not occur as rapidly. The results further show that the GMFA derivative can be crosslinked while in the acetal form at pH 7–9, but not at pH 11.

EXAMPLE IX

This examples describes the wet and dry tensile strength provided by the cationic aromatic aldehydes. The aldehydes were evaluated for tissue applications.

The cationic aromatic acetal starch derivative of Example I (waxy maize starch treated with 3% DEC and 10% GMFA). The starch derivatives was jet cooked at 270° C. and pH 2.5 to disperse the starch and convert the acetal to the aldehyde. For comparison, a cationic non-aromatic acetal-containing derivative, i.e., a waxy maize starch treated with 3% DEC and 10% N-2,2-dimethoxyethyl)-N-methyl-2-chloroacetamide (DMCA), was evaluated. The starch was likewise dispersed and the acetal groups converted to the aldehyde groups. Also evaluated was a synthetic polymer.

A polyethyleneimine (PEI) crosslinker (mol. wt. 60,000) was used with the aromatic acetal starch derivative. It was added to the pulp at 30 lb./ton after the starch dispersion and just before the headbox. The starch and polymer dispersions were then added to the paper furnish at 10 lb./ton. The furnish was a bleached softwood Kraft. The paper sheets were prepared on the Noble and Wood Sheet Mold. The paper weight was about 5 lb./1000 ft.$^2$. The wet and dry tensile strength results are shown in Table II. The wet web strength results are shown in Table III.

TABLE II

| Sample | Dry Tensile Strength B.L. (m.) | Wet Tensile Strength 5 sec. B.L. (m.) | Wet Tensile Strength 30 min. B.L. (m.) | Decay (%) |
|---|---|---|---|---|
| Cationic Starch (Control - No Aldehyde Groups) | 5480 | 220 | 123 | 55 |
| Cationic Aromatic Aldehyde-Containing Starch Derivative (Control - Aldehyde Groups but No Crosslinker)* | 5103 | 257 | 232 | 10 |
| Cationic Aromatic Aldehyde-Containing Starch Derivative* Crosslinked with PEI | 6029 | 1085 | 1075 | 1 |
| Cationic Non-Aromatic Aldehyde-Containing Starch Derivative** (comparative) | 5288 | 931 | 322 | 65 |
| Synthetic Polymer*** (comparative) | 5092 | 1194 | 1134 | 5 |

*Waxy maize treated with 3% DEC and 10% GMFA.
**Waxy maize treated with 3% DEC and 10% DMCA.
***Kymene/Dowstrength - a synthetic acrylamide.

The results show that the crosslinked starch derivative provided permanent wet tensile strength (decay of only 1%) whereas the same derivative which had not been crosslinked provided very little wet strength. The crosslinked starch dervative was superior to the synthetic polymer in dry tensile strength (6029 vs. 5092) and decay (1% vs. 5%) but slightly lower in wet tensile strength (1085 vs. 1194 at 30 min.).

A comparison of the aromatic aldehyde-containing starch derivative (used with no crosslinker) and the non-aromatic aldehyde-containing derivative shows that the aromatic derivative provided comparable dry tensile strength (5103 vs. 5288) but significantly less wet tensile strength (257 vs. 931 after 5 sec. and 232 vs. 322 after 30 min.) than the non-aromatic derivative. The use of the crosslinker provided permanent wet tensile strength.

TABLE III

| Sample | No. of Presses - % Moisture 1st-66% | 2nd-63% | 3rd-40% | 4th-31% | 5th-24% | Dry Tensile Strength (lb./in.) |
|---|---|---|---|---|---|---|
| Blank | 738 | 713 | 3106 | 5905 | 8625 | 53482 |
| Cationic Aromatic Aldehyde-Containing Starch Derivative crosslinked with PEI | 728 | 827 | 7778 | 11993 | 27282 | 77977 |
| Cationic Non-Aromatic Aldehyde-Containing Starch Derivative** (comparative) | 663 | 718 | 4087 | 8129 | 18830 | 87617 |

*Waxy maize treated with 3% DEC
**Waxy maize treated with 3% DEC

The results show that the crosslinked aromatic aldehyde-containing starch derivative provided superior wet web strength at moisture contents below 63%. The non-aromatic aldehyde-containing starch derivative showed lower wet web strength which was not significantly better than the blank until the 40% moisture level was reached.

EXAMPLE X

This example illustrates the water-resistant properties of bonds formed with corrugating adhesives prepared using a granular (i.e., non-dispersed) aromatic aldehyde-containing starch derivative as the uncooked portion of a corrugating adhesive.

Preparation of The Carrier Starch

To 2835.6 g of water was added 1360 g. of corn starch. The resultant slurry was heated to 72° C. with stirring. About 238.6 g. of water containing 108.8 g. of sodium hydroxide was then added to the slurry and heating was continued for about 15 minutes, after which about 2835.6 g. of water was added to cool and dilute the resultant dispersion.

Preparation of The Full-Formulation Adhesive

The carrier starch dispersion prepared above was added over a 20-minute period to a slurry of 4760 g. of the aromatic aldehyde-containing corn starch derivative, 108.8 g. borax ($Na_2B_4O_7.10H_2O$) and 8506.8 g water. The acetal-containing corn starch derivative (prepared using the procedure of Example I and 10% GMFA) was converted to the aldehyde in granular form by maintaining the 10% starch slurry at 35° C. and pH 2.2 for 18 hours. The carrier starch/granular starch mixture was stirred for 30 minutes. The starch aldehyde was used in combination with polyethyleneimine (mol. wt. 60,000) as the crosslinker (1% based on starch on a dry basis). The acetal-containing corn starch derivative.

The adhesive was employed in the preparation of a double-faced bond in corrugated paperboard via the following method which simulates conditions on the double-back section of a corrugator. The adhesive was applied at 6 mil thickness by a Bird applicator to a glass plate and was transferred to sheets of single-face web (of 62 lb./1000 ft.$^2$ (0.302 kg./m.$^2$) wet strength liner and 30 lb./1000 ft.$^2$ (0.146 kg./m.$^2$) wet strength medium) by means of direct hand pressure. The single-face samples were then placed on top of 62 lb./1000 ft.$^2$ (0.302 kg./m.$^2$) wet strength liner and the resultant double-faced board was bonded at 0.25 psi on a hot plate at 177° C. for 4 seconds. The bonded boards were then placed in a conditioning atmosphere of 22° C., 50% relative humidity for 24 hours, after which 2×4 inch samples of each of the boards were placed in water at 22° C. for the indicated time.

At the end of this period the samples were evaluated by a wet pin adhesion test based on that of the TAPPI Standard UM 802 (formerly R 337) using a Hinde and Dauch Crush Tester obtainable from Testing machines Incorporated, Mineola, N.Y. The test results were recorded in pounds (per 8 sq. in. of board sample at the point of initial bond failure of the double-face liner from the single-face web.

The results are shown in Table IV.

TABLE IV

| Raw Portion | 1 hr. | 4 hr. | 17 hr. | 24 hr. |
|---|---|---|---|---|
| Corn Blank | 0 | 0 | 0 | 0 |
| Corn/GMFA/PEI | 7 | 6 | 5 | 5 |

The results indicate that only the adhesive based on the aldehyde-containing starch derivative exhibited water resistance.

EXAMPLE XI

This example illustrates that adhesive bonds can be formed using the aromatic aldehyde-containing starch derivative. This indicates that the derivative can also be used as the cooked portion of a corrugating adhesive.

Preparation of The Cooked Starch

The indicated starch was slurried in distilled water at 10% solids and the pH of the slurry adjusted to 2.5. The starch was cooked for 20 minutes in a boiling water bath, quickly cooled to room temperature and the pH readjusted to desired value (typically 5 to 13). Films were drawn using a 0.0015 inch applicator. The indicated cross-linking material was added to the starch cook directly before application of the adhesive film. The paper used was 62 lb./1000 ft.$^2$ wet strength liner board and 30 lb./1000 ft.$^2$ medium. The film was applied to the medium and the liner board was pressed to the medium between two glass plates for 30 seconds. The single face sample was cured by placing it on a hot plate preheated to 177° C. (350° F.) for 5 seconds. The samples were cooled, dried overnight, and soaked in distilled water for the indicated amount of time. The joint was pulled apart by hand and evaluated for fiber tear. The results are shown in Table V.

TABLE V

| Sample No. | Cooked at pH 2.5 and adjusted to pH | Cross-linker | Tear after Soak Time of 5 min. | Tear after Soak Time of 1 hr. | Tear after Soak Time of 24 hr. |
|---|---|---|---|---|---|
| 1 | 8.3 | — | paper rip | None | N.D. |
| 2 | 5.0 | — | N.D. | paper rip | None |
| 3 | 8.3 | DETA | fiber tear | slight fiber tear | N.D. |
| 4 | 5.0 | DETA | N.D. | fiber tear | slight fiber tear |
| 5 | 8.3 | PEI | paper rip | slight fiber tear | N.D. |
| 6 | 5.0 | PEI | N.D. | fiber tear | slight fiber tear |

DETA—diethylene triamine
PEI—polyethyleneimine (mol. wt. 1200)
N.D.—not determined The results show that no permanent water-resistance is imparted when the crosslinker is absent. The results show that the use of the polyamine crosslinkers DETA and PEI imparted permanent water-resistance under both alkaline and acid conditions.

Now that the preferred embodiments of the invention have been described in detail, various modifications and improvements thereon will become readily apparent to those skilled in the art. Accordingly, the spirit and scope of the present invention are to be limited only by the appended claims and not by the foregoing specification.

We claim:

1. An aldehyde-containing polysaccharide derivative having the formula

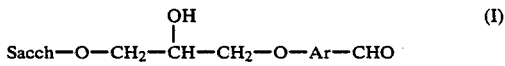

or Sacch-O—$CH_2$—Ar—CHO (II), wherein Sacch-O— represents a polysaccharide molecule and Ar in formula I is a divalent aryl group or an alkaryl group and Ar in formula II is a conjugated heterocyclic aryl or alkaryl group.

2. An aldehyde-containing polysaccharide having the formula

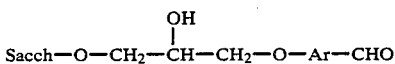

where Ar has the structure

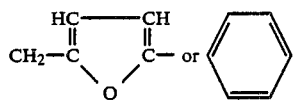

or Sacch-O—CH$_2$—Ar—CHO where Ar has the structure

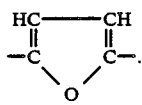

3. An acetal-containing polysaccharide derivative which has the structure

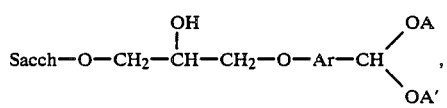

wherein Sacch-O— represents a polysaccharide molecule; Ar is a divalent aryl group which can contain an ether linkage or an alkaryl group; and A and A' are independently an alkyl group or A and A' together form at least a five-membered cyclic acetal.

4. The derivative of claim 3, wherein Ar has the structure

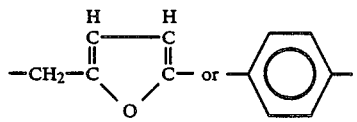

and A and A' are CH$_3$.

5. The derivative of claim 1 or 3, wherein the polysaccharide is a starch in granular or dispersed form.

6. The derivative of claim 5, wherein the starch is a waxy maize, corn, high amylose corn, potato, rice, sweet potato, or tapioca starch.

7. The derivative of claim 6, wherein the starch is waxy maize.

8. The derivative of claim 7, wherein the starch contains one or more cationic, anionic, nonionic or zwitterionic groups.

9. The derivative of claim 8, wherein the starch contains cationic groups.

10. The derivative of claim 9, wherein the cationic groups are diethylaminoethyl ether groups.

11. The derivative of claim 1 or 3, wherein the polysaccharide is a gum.

12. The derivative of claim 11, wherein the gum is guar gum.

13. The derivative of claim 1 or 3, wherein the polysaccharide is a cellulose or cellulose derivative.

14. A crosslinked product having the structure

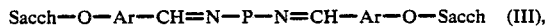

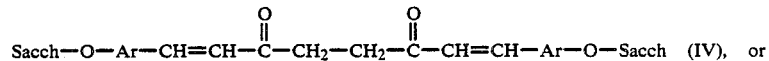

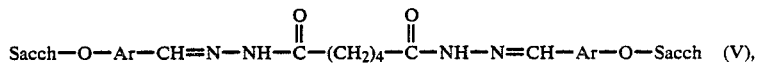

wherein Sacch-O— represents a polysaccharide molecule, P represents a divalent group, and Ar represents a divalent aryl group or alkaryl group.

15. The crosslinked product of claim 14, wherein the polysaccharide is a starch; Ar is

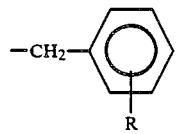

with R being a substituent on the aromatic ring; and P is —CH$_2$—CH$_2$—(NH—CH$_2$—CH$_2$)$_x$ with x being 0 or greater.

16. The crosslinked product of claim 14, prepared by dispersing an aldehyde-containing polysaccharide derivative having the formula $$\text{Sacch}-\text{O}-\text{CH}_2-\overset{\overset{\text{OH}}{|}}{\text{CH}}-\text{CH}_2-\text{O}-\text{Ar}-\text{CHO}$$

or Sacch-O—CH$_2$—Ar—CHO in water and reacting the dispersed polysaccharide with an effective amount of a multifunctional crosslinker selected from the group consisting of an aliphatic polyamine containing at least two primary amine groups, a polyhydrazine, a polyhydrazide, a polysemicarbazide, a polythiol, and a polyketone.

17. The crosslinked product of claim 16, wherein the reaction is carried out at a pH below about 13.

18. The crosslinked product of claim 17, wherein the crosslinker is the polyamine or the polyhydrazide and the pH is about 2.5 to below about 13.

19. The crosslinked product of claim 18, wherein the polyamine is diethylene triamine or a polyethyleneimine having a molecular weight of about 12,000–100,000, and the polyhydrazide is adipic dihydrazide.

20. The crosslinked product of claim 14, prepared by dispersing an aldehyde-containing polysaccharide derivative having the formula

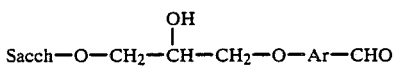

or Sacch-O—CH$_2$—Ar—CHO in water and reacting the dispersed polysaccharide with an effective amount of a cyclic or noncyclic polyketone as a crosslinker at a pH of above 11.

21. The crosslinked product of claim 14, prepared by dispersing an acetal-containing polysaccharide derivative having the formula

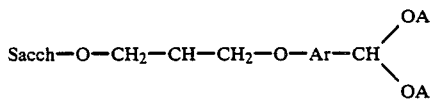

in water and reacting the dispersed polysaccharide with an effective amount of an aliphatic polyamine as a crosslinker containing at least two primary amine groups at a pH about 9.

22. The crosslinked product of claim 21, wherein the crosslinker is a polyethylenimine and the pH is above about 2.

23. In a method for making paper having dry strength, wet strength, temporary wet strength, or combinations thereof, the step which comprises adding, as a strength aid, to the stock at any stage prior to forming a web, an effective amount of the aldehyde-containing polysaccharide derivative of claim 1 or 3.

24. The paper containing the strength aid of claim 23.

25. An improved water-resistant, alkaline-curing corrugating adhesive composition comprising an ungelatinized starch, a gelatinized starch, an alkali, and water, wherein the improvement comprised the presence of the aldehyde-containing starch derivative of claim 5 as at least a part of the ungelatinized starch in combination with an effective amount of a multifunctional crosslinker selected from the group consisting of an aliphatic primary polyamine a cyclic or noncyclic, a polyketone, a polyhydrazine, a polyhydrazide, a polysemicarbazides and a polythiol.

26. An improved water-resistant, alkaline-curing corrugating adhesive composition comprising an ungelatinized starch, a gelatinized starch, an alkali, and water, wherein the improvement comprises the presence of the aldehyde-containing starch derivative of claim 5 as at least a part of the gelatinized starch.

27. An improved water-resistant, alkaline-curing corrugating adhesive composition comprising an ungelatinized starch, a gelatinized starch, an alkali, and water, wherein the improvement comprises the presence of the aldehyde-containing starch derivative of claim 5 as at least a part of the ungelatinized starch in combination with an effective amount of a multifunctional crosslinker selected from the group consisting of an aliphatic primary polyamine a cyclic or noncyclic, a polyketone, a polyhydrazine, a polyhydrazide, a polysemicarbazides and a polythiol and the presence of the aldehyde-containing starch derivative of claim 5 as at least a part of the gelatinized starch.

28. The improved water-resistant, alkaline-curing corrugating adhesive or claim 25, 26, or 27 wherein the aldehyde-containing starch is the entire part of the ungelatinized starch, or the entire part of the gelatinized starch, or entire part of both the ungelatinized starch and gelatinized starch.

29. The crosslinked product of claim 20, wherein the polyketone is 2,5-hexanedione.

* * * * *